US011219857B1

(12) United States Patent
Sekizkardes et al.

(10) Patent No.: US 11,219,857 B1
(45) Date of Patent: Jan. 11, 2022

(54) MECHANICALLY ROBUST PIM-1 AND POLYPHOSPHAZENE BLENDED POLYMER FOR GAS SEPARATION MEMBRANES

(71) Applicant: United States Department of Energy, Washington, DC (US)

(72) Inventors: Ali Sekizkardes, Pittsburgh, PA (US); Victor Armanda Kusuma, Pittsburgh, PA (US); Surendar R. Venna, Bethel Park, PA (US); David Hopkinson, Morgantown, WV (US)

(73) Assignee: United States Department of Energy, Washington, DC (US)

( * ) Notice: Subject to any disclaimer, the term of this patent is extended or adjusted under 35 U.S.C. 154(b) by 183 days.

(21) Appl. No.: 16/233,817

(22) Filed: Dec. 27, 2018

Related U.S. Application Data (60) Provisional application No. 62/611,025, filed on Dec. 28, 2017.

(51) Int. Cl.
*B01D 53/22* (2006.01)
*B01D 71/76* (2006.01)

(52) U.S. Cl.
CPC .......... *B01D 53/228* (2013.01); *B01D 71/76* (2013.01)

(58) Field of Classification Search
CPC ...... B01D 53/228; B01D 71/52; B01D 71/58; B01D 71/76; B01D 2257/504
See application file for complete search history.

(56) References Cited

U.S. PATENT DOCUMENTS

| | | | | |
|---|---|---|---|---|
| 4,749,489 A * | 6/1988 | Allen | ..................... | B01D 71/72 210/500.21 |
| 4,783,202 A * | 11/1988 | Kraus | ..................... | B01D 71/72 210/500.27 |
| 4,959,442 A * | 9/1990 | Ohkawa | ............... | C08G 79/025 525/534 |
| 5,022,996 A * | 6/1991 | McCaffrey | ........... | B01D 53/228 210/500.27 |
| 2006/0016331 A1* | 1/2006 | Stewart | ................... | B01D 71/76 95/49 |
| 2013/0146538 A1* | 6/2013 | Liu | ..................... | B01D 53/228 210/650 |
| 2014/0255636 A1* | 9/2014 | Odeh | ..................... | B01D 71/58 428/36.5 |
| 2016/0263532 A1* | 9/2016 | Odeh | ................... | B01D 53/228 |

FOREIGN PATENT DOCUMENTS

WO   WO 2016/118581 A1 * 7/2016 ............. B01D 53/22

* cited by examiner

*Primary Examiner* — Jason M Greene
(74) *Attorney, Agent, or Firm* — Timothy L. Harney; Aaron R. Keith; Michael J. Dobbs (57) ABSTRACT

Accordingly, it is an object of this disclosure to provide a blend polymeric membrane to provide the separation of $CO_2$ from a gaseous mixture. The blend polymeric membrane comprises a blend of polyphosphazene and polymers of intrinsic microporosity. Further, the present disclosure also provides a method of use for the blend polymeric membrane for the separation of gases in a gaseous mixture.

13 Claims, 10 Drawing Sheets

MECHANICALLY ROBUST PIM-1 AND POLYPHOSPHAZENE BLENDED POLYMER FOR GAS SEPARATION MEMBRANES

CROSS REFERENCE TO RELATED APPLICATIONS

This application claims the benefit of U.S. Provisional Application No. 62/611,025 filed on Dec. 28, 2017. The disclosure of the full application is incorporated herein by reference.

GOVERNMENT INTEREST

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments consistent with the present disclosure relate to blending polymer membranes. More specifically, embodiments relate to blending polymer membranes consisting of methoxy ethoxy polyphosphazene (MEEP) and polymers of intrinsic microporosity (PIM) for gas capture and separation applications.

BACKGROUND OF THE INVENTION

Carbon sequestration is a viable alternative to reduce the emissions of the greenhouse gas carbon dioxide ($CO_2$) from large point sources. Such sequestration holds the potential to provide deep reductions in greenhouse gas emissions. In general, carbon sequestration is a two-step process where the capture of $CO_2$ from a gas stream is followed by permanent storage. The capture step for $CO_2$ represents a major cost in the overall process.

Of particular interest for $CO_2$ sequestration are power generation point sources that use fossil fuels. Since nearly one-third of the anthropogenic $CO_2$ emissions are produced by these facilities, conventional coal-burning power plants and advanced power generation plants—such as integrated gasification combined cycle—present opportunities where carbon can be removed then permanently stored. At the current time, pulverized coal-fired-base steam cycles have been the predominant electric power generation technology. These will continue to be used in the near future. Technologies for capturing $CO_2$ will need to be applied to new more efficient coal-fired facilities and will need to be retrofitted onto existing plants.

Developments in post-combustion carbon capture include liquid and solid absorption, mineralization, and membrane separation. Solvent based absorption is commercially used with flue gas by passing it through solution(s) that extract $CO_2$. This method is efficient, but due to high energy cost it's not a long term solution. Mineralization requires additional reactions and time to convert flue gas into a solid form, also not a long term solution. Membranes offer compactness, modularity, ease of installation, low maintenance and energy cost. However, membranes are ideally used in bulk separation with concentrated gasses and have suboptimal parameters in selectivity or permeability. To overcome these challenges, ongoing research and development is probing membrane material design and synthesis in composing a membrane with desirable permeability and selectivity.

Membranes are usually made of flexible polymers that contour to various surfaces and allow molecules to pass through, making them ideal material to use. During gas separation the membrane must have enough strength to withstand the stress and strain without any damage. In general, membrane composition will determine not only its mechanical strength, but also its functional requirement. Thus, the performance of a polymeric membrane toward $CO_2$ separation is usually determined by two factors, the ability of the polymer to form a strong and self-standing membrane, and the capability of the membrane to selectively permeate $CO_2$ gas.

Membrane theory states two major factors are responsible for molecule permeation 1) the pore size and 2) the interactions with the membrane. Specifically, molecules permeate the membrane through amorphous regions, micropores, attractive forces, and diffusion. The driving force is concentration and a pressure gradient created by flue gas composition and negative pressure usually formed by a vacuum on the permeate side of the membrane. An innovative chemical composition will select the type of gas that permeates and the flow rate of the membrane. Previously determined materials suitable for membranes include polymers. Polymers are commonly composed of a carbon backbone in both natural and synthetic products. Exemplary polymers include without limitation polyvinylidene fluoride, polypropylene, cellulose, polysulfone, polycarbonate, polyimide, polyamide, polyethylene, polyperfluroalkoxy, polyetheretherkeone, polytetrafluoroethylene, etc., and combinations thereof.

Unfortunately, previous polymer membranes present several disadvantages. Polymer membrane materials are susceptible to decomposition or deactivation of functional groups of membranes in presence of acidic gases such as $SO_x$ and $NO_x$. Additionally, these prior carbon based polymer membranes were high-cost and had complex material design and preparation.

A different class of hybrid polymers are polyphosphazenes (PPZ) that have an alternating phosphorus and nitrogen backbone. The unusual nitrogen phosphorus bond is not unsaturated with no delocalization of the double bond, therein having free rotation and flexibility. The polymer is synthesized from inexpensive material, phosphorus pentachloride and ammonium chloride, this forms the building block hexachlorophosphazene, which forms the inorganic backbone when heated. Through nucleophilic attack a halogen, usually chlorine, is removed and replaced by an organic molecule. Therein forming an organic inorganic hybrid polymer.

Synthesis is controlled either bidirectional or mono-directional with addition of different monomer units possible. The controlled addition of single monomeric units creates block polymers and the subsequent polymerization of the block polymer produces copolymers. These customizable monomeric units and organic groups enhance diversity and functionality of polyphosphazenes. This leads to a range of possible shapes without limitation that are branched, comb-like, and spherical or any combination thereof. In addition to the shape, the phosphorus atom is more versatile and diverse than standard carbon based polymer due to the different possible substituted groups (R groups) that may be attached, forming heteropolymers and homopolymers. This gives phosphazenes a range of unique function and applications without limitation in flame retardants, sealants, gaskets, ion transfer in batteries, membranes, medical applications, and many more.

However, polyphosphazene based membranes themselves also have disadvantages. The membranes had poor mechanical and thermal stability. The membranes were very difficult to form into freestanding films (membranes) due to the gel-like nature of the materials. Additionally, the membranes displayed only moderate $CO_2$ permeability.

Another unique class of polymers are the polymers of intrinsic microporosity (PIM). (PIMs). PIMs have a randomly contorted molecular structure, bridging the void between microporous and polymeric materials. The rotational freedom of these PIM materials has been removed from the polymer backbone. These polymers exhibit properties analogous to those of conventional microporous materials including large and accessible surface areas, interconnected micropores of less than 2 nm in size, as well as high chemical and thermal stability, but, in addition, possess some favorable properties of conventional polymers including good solubility and easy processability for the preparation of polymeric membranes. Membranes from PIMs have displayed some positive properties for gas separation, for example, high permeability. However, those PIM membranes have also displayed lower gas separation selectivities. Those PIM membranes are also highly brittle and are prone to mechanical defects such as cracking.

Disclosed herein are embodiments disclosing a type of polymer membrane prepared by blending the polymers polyphosphazenes and PIMs. Individually, either of these two materials suffer from serious drawbacks that make them commercially impractical as noted supra. The physical properties and gas transport properties of the blend polymeric membrane provide membranes with exceptional properties that are unexpected based on the properties of the individual constituents. This blended material overcomes all of the practical difficulties that prevent the individual materials from being commercially viable, and result in a new material with surprisingly high gas transport properties and robust mechanical properties.

Accordingly, it is an object of this disclosure to provide a blend polymeric membrane to provide the separation of $CO_2$ from a gaseous mixture. The blend polymeric membrane comprises a blend of polyphosphazene and PIM. Further, the present disclosure also provides a method of use for the blend polymeric membrane for the separation of gases in a gaseous mixture.

These and other objects, aspects, and advantages of the present disclosure will become better understood with reference to the accompanying description and claims.

SUMMARY OF THE INVENTION

Embodiments relate to providing a blend polymeric membrane comprising a polymer blend of polyphosphazene and polymers of intrinsic microporosity useful in membranes for gas ($CO_2$) capture and separation applications. One or more embodiments enable casting more flexible/less brittle films compared to previous PIM composite materials, as shown by the superior failure strain values of the blended material. Embodiments enable simple and cost efficient polymeric constituents were used to form a composite membrane. Polyphosphazene/PIM blend films are soluble in common solvents, have a high concentration of $CO_2$ interaction sites, and high $CO_2$ permeability and $CO_2/N_2$ selectivity compared to most other polymers, including a formulation that is on the 2008 Robeson upper bound plot. The blend also provides for highly hydrophobic membrane formation compared to pure polyphosphazene membranes. The present disclosure also provides for a method of use for such.

BRIEF DESCRIPTION OF THE DRAWINGS

These and other features, aspects, and advantages of the multiple embodiments of the present invention will become better understood with reference to the following description, appended claims, and accompanied drawings where:

FIG. 4A. depicts a FT-IR analysis of PIM-1, MEEP and their blends as 20, 30, 55 wt % MEEP in PIM-1 while

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a blend polymeric membrane composition and method for separating $CO_2$ from a gaseous mixture. The blend polymeric membrane is a blend of polyphosphazene and polymers of intrinsic microporosity (PIM).

Polyphosphazenes

Polyphosphazenes are advantageous as polymeric membranes for carbon dioxide ($CO_2$) separations due to the synthetic tunability, backbone flexibility, stability, and property optimization. The co-substitution of different side groups can multiply the properties at same time, which is especially important in this application since the membranes not only require a high $CO_2$ affinity, but can advantageously be mechanically strong and self-standing.

Ether side groups, such as a 2,2-methoxyethoxy ethoxy (MEE) group, provide polymers opportunities for interactions with $CO_2$ due to the dipole-quadrupole interactions. However, co-substitutions are required to increase the mechanical properties of the membrane. Bulky and rigid side groups such as aromatic derivatives are believed to generate too much hindrance to the backbone mobility, and as a consequence, the membranes demonstrated a significant decrease in gas permeability. Thus, a bulky but flexible side group, such as a cyclohexanoxy ($C_6$), was linked to the polymer backbone to enhance the membrane's mechanical properties. The flexibility of the $C_6$ unit conformational transformations could maintain the overall flexibility of the polymer network without significantly decreasing gas permeability.

Polyphosphazenes including ether side chain groups are useful for practicing the present disclosure. Such polyphosphazenes include, for example, a polyphosphazene having a plurality of monomeric units including one or more aliphatic ether side groups such as one or more alkanoxy side groups, e.g., one or more $C_{1-12}$ alkanoxy side groups, one or more cycloalkanoxy side groups, e.g., one or more $C_{5-8}$ cycloalkanoxy side groups, or mixtures thereof. Alternatively, or in addition, the polyphosphazene can include a plurality of monomeric units having one or more aromatic ether side groups. The one or more ether side groups can be further substituted such as with one or more additional ether groups, e.g., a methoxyethoxy ethoxy side group, a tetrahydrofuranyloxy side group, a tetrahydropyranyloxy side group, etc., or with one or more halogens, e.g., fluorine, alkoxides, fluorinated alkoxides, e.g., —$OCF_2CH_3$, or combinations thereof. In another aspect of the present disclosure, the polyphosphazene can include a plurality of monomelic units having both side groups as ether side groups, e.g., the polyphosphazene includes a plurality of monomeric units having two $C_{1-12}$ alkanoxy side groups, or two cycloaikanoxy side groups or a mixture of cycloalkanoxy and $C_{5-8}$ cycloalkanoxy side groups. In some embodiments, the polyphosphazene includes a plurality of monomer units having two cycloalkanoxy side groups, e.g., $C_{5-8}$ cycloaikanoxy side groups, or a mixture of an aliphatic ether side group and a cycloaikanoxy side group, e.g., a mixture of a $C_{1-12}$ alkanoxy group and a $C_{5-8}$ cycloalkanoxy side group.

In one aspect of the present disclosure, the polyphosphazenes can be represented by the following formula (I);

(I)

wherein "n" represents the number of monomer units and can be from about 5 to 50,000, e.g., from about 10 to about 20,000; OR and OR' represent the same or different aliphatic ether groups or aromatic ether groups which can be substituted with one or more ether groups, halogens, e.g., fluorine, alkoxides, fluorinated alkoxides, e.g., —$OCF_2CH_3$, or combinations thereof. In one aspect of the present disclosure, OR and OR' represent the same or different, substituted or unsubstituted, aliphatic ether group, e.g., a $C_1$-12 alkanoxy group, or C cycloalkanoxy group. In an embodiment of the present disclosure, at least one of OR and OR' represents a cycloalkanoxy group, e.g., a $C_5$-8 cycloalkanoxy group.

In one embodiment, the polyphosphazene includes a blend polyphosphazene having a combination of differently substituted polyphosphazenes. For example, the polyphosphazenes of the blend polymeric membrane may include a first polyphosphazene with an ether side group and a second polyphosphazene with a triflouroethoxy (TFE) side group. In a preferred embodiment, the polyphosphazene comprises a polyphosphazene with an ether side group and a polyphosphazene with a phenoxy side group.

Figure 1:
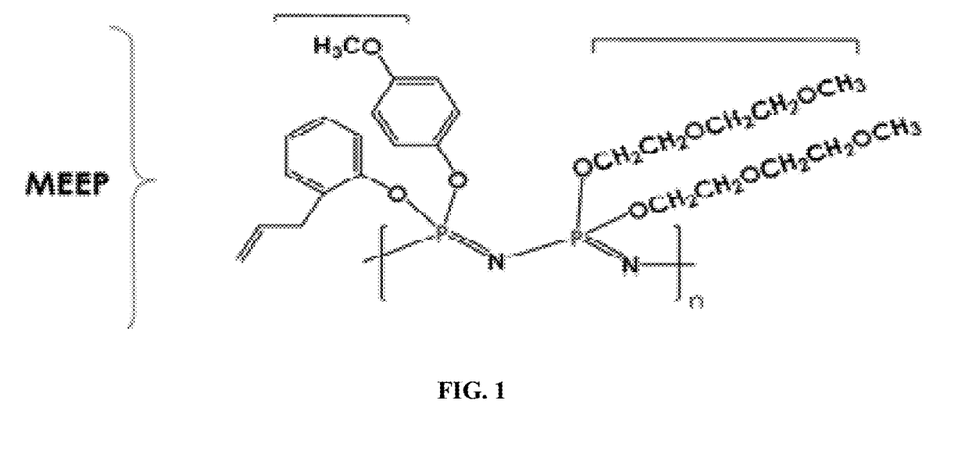
FIG. 1 illustrates MEEP.

In a preferred embodiment, the homopolymer, Poly[bis-(2-(2-methoxy)ethoxy)ethoxyphosphazene], or MEEP, is utilized in the blend polymeric membrane. MEEP is an amorphous adhesive gum with a low glass transition at −80° C. The structure of the MEEP is shown in FIG. 1.

Polymers of Intrinsic Microporosity

Organic polymers of intrinsic microporosity are a class of polymers known to the person skilled in the art. Organic polymers of intrinsic microporosity (PIM) are polymers with a high free volume, which are characterized by the incorporation of rigid sequences without single-bonded chains in the backbone and with kinked chains to prevent efficient chain packing. In principle, it is possible to use any PIM that are known to the person skilled in the art and/or can be produced by known methods. Suitable methods of forming the aforementioned organic polymer of intrinsic porosity (PIM) are known and are described, for example, in Budd et al., "Solution-processed, organophilic membrane derived from a polymer of intrinsic microporosity", Advanced Materials, 2004, 16, pages 465 to 459 and also in Young et al., "Molecular engineering of PIM-1/Matrimide blend membranes for gas-separation", Journal of Membrane Science, 2012, 407 to 408, pages 47 to 57.

Figure 2:
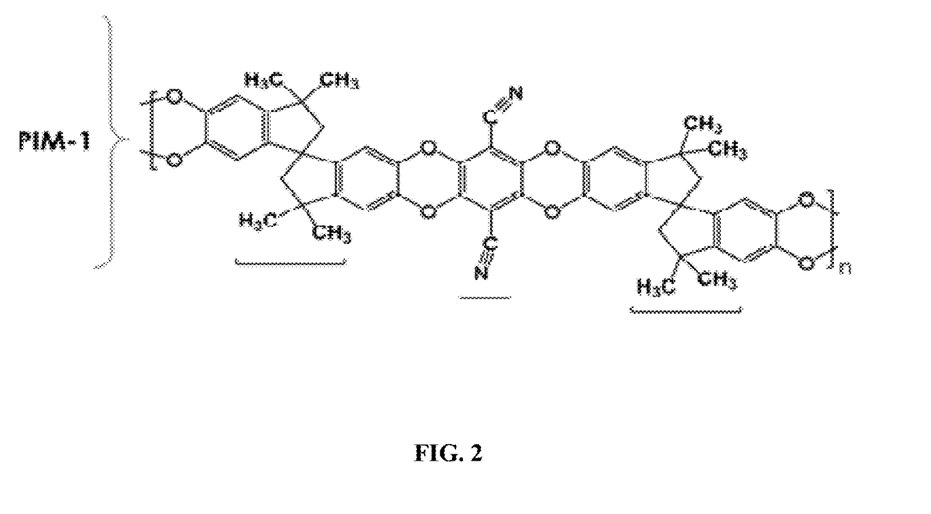
FIG. 2 illustrates PIM-1.

In a preferred embodiment, PIM-1 is utilized in the blend polymeric membrane. PIM-1 is a microporous polymer and similar to other conventional polymers. PIM-1 is synthesized by a polycondensation reaction of 1D monomers. In contrast to other standard polymers, PIM-1 features unprecedented surface area and free volume because its monomers 3,3,3',3'-tetramethyl-1,1'-spirobisindane-5,5',6,6'-tetrol (TTSBI) and 1,4-dicyanotetrafluorobenzene (DCTB) provide the synergetic combination of high rigidity and flexible chain packing properties to PIM-1. The structure of the PIM-1 is shown in FIG. 2. Unlike most porous polymers, PIM-1 dissolves in common solvents and may be processed into a polymeric membrane film for various applications such as gas separation.

PIM-1 previously demonstrated promising gas separation membrane properties such as high $CO_2$ permeability. However, similar to other reported PIM-1 materials, cast membrane films suffer from their highly brittle nature, making them very difficult to use without cracking. Still, PIM-1 is promising for gas separation applications because of its high $CO_2$ permeability properties. However, the $CO_2/N_2$ selectivity for PIM-1 is only moderate.

Blend Polymeric Membrane

Figure 3:
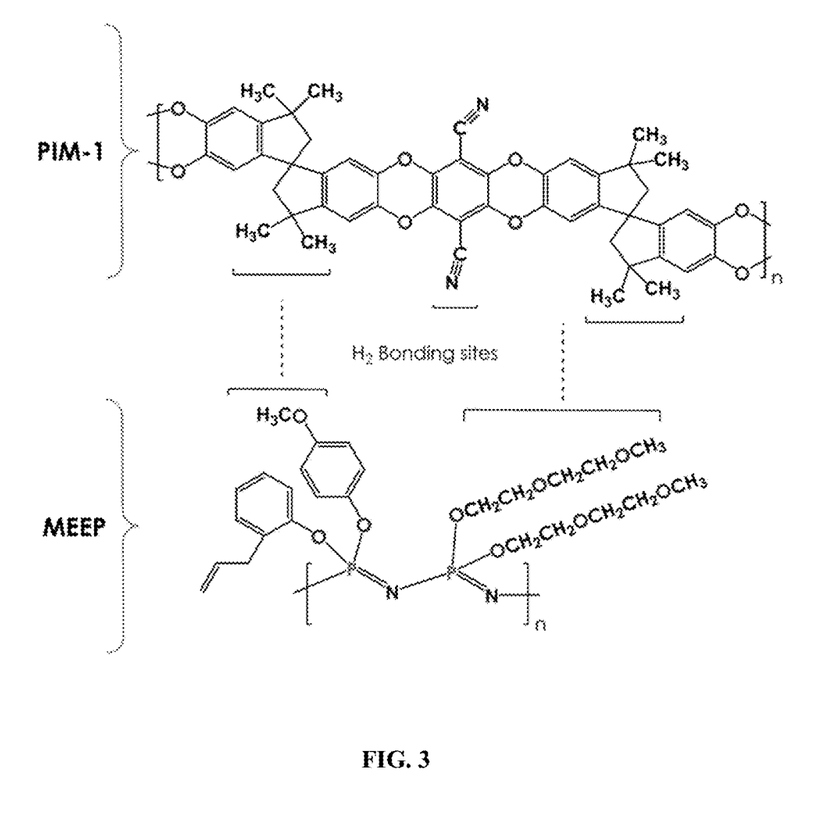
FIG. 3. illustrates interactions between PIM-1 and MEEP.

Given the technological needs of gas separation membranes, which should offer high $CO_2$ permeability and $CO_2/N_2$ selectivity as well as mechanical flexibility and chemical stability. Embodiments disclosed herein relate to novel composite membranes composed of PIM-1 and MEEP as illustrated in FIG. 3.

Individually, either of these two materials suffer from serious drawbacks that make them commercially impractical. The physical properties and gas transport properties of the blended membrane for post-combustion flue gas carbon capture applications are presented here. The result is a material with exceptional properties that are unexpected based on the properties of the individual constituents.

Embodiments relate to a blend polymeric membrane prepared by blending polymers of intrinsic micro porosity (PIM-1) with Poly[bis-(2-(2-methoxy)ethoxy)ethoxyphosphazene] (MEEP). The blend polymer membrane is particularly well suited for use in a membrane for gas separation. In at least one embodiment, PIM-1 was blended with 20, 30 and 55 wt % MEEP and membranes are denoted as 20 wt % MEEP/PIM-1, 30 wt % MEEP/PIM-1 and 55 wt % MEEP/PIM-1, respectively where wt % is defined as the weight percent of polyphosphazene in the polyphosphazene/PIM blend. The blend polymeric membrane of the invented material was characterized by common techniques such as FT-IR, TGA, SEM, and gas permeability measurements.

Figure 4A:
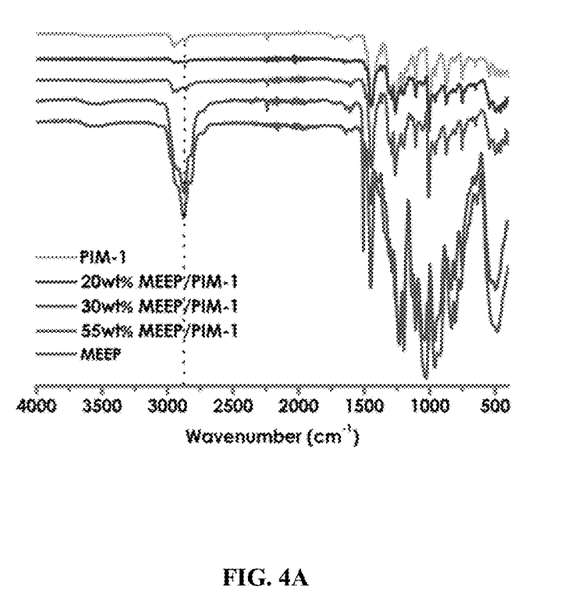
Figure 4B:
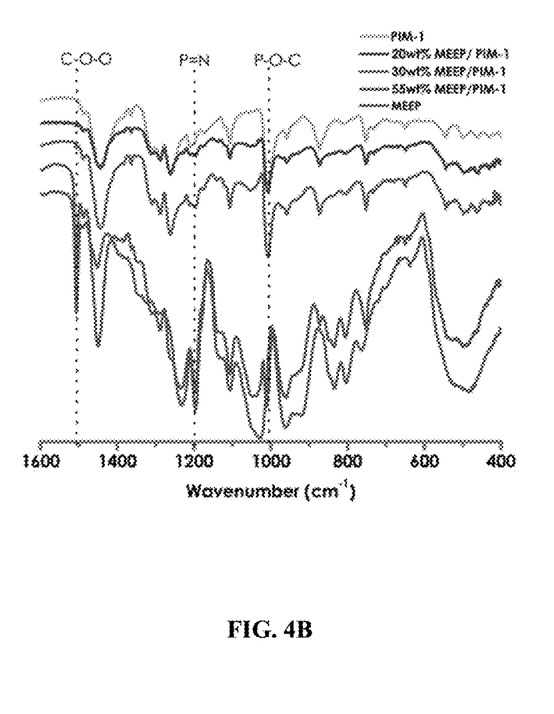
FIG. 4B depicts the region of 1600-400 wave number (cm-1) of FIG. 4A is expanded.
Figure 5:
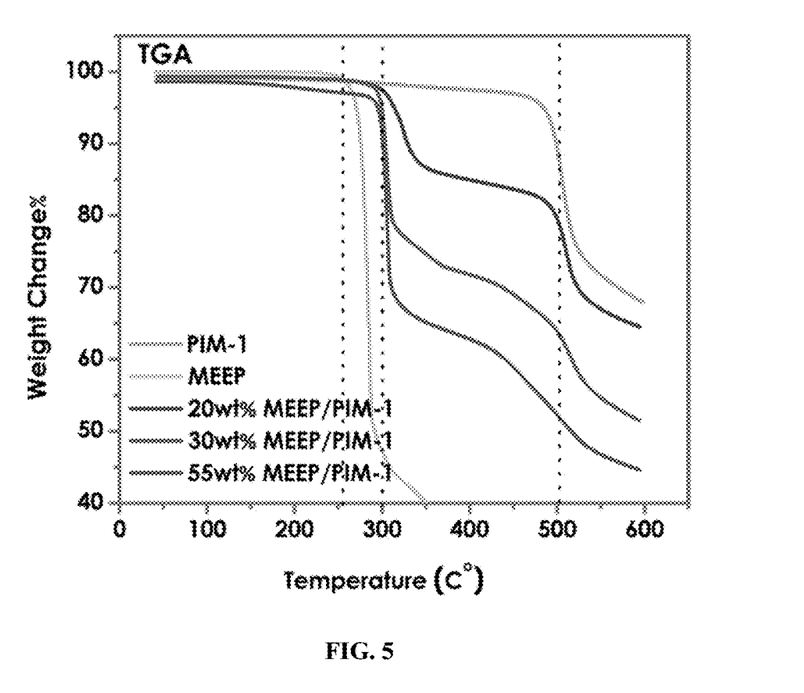
FIG. 5 depicts a graph illustrating TGA analysis of PIM-1, MEEP and their blends as 20, 30, 55 wt % MEEP in PIM-1.

FT-IR studies indicate that increasing the MEEP concentration in PIM-1 results in higher intensity of characteristic MEEP peaks corresponding to —$CH_3$, C—O—O, P=O, P—O—C(See FIGS. 4A-4B). Thermogravimetric analysis (TGA) of membranes reveals two apparent decomposition temperatures resulting from the two different materials (See FIG. 5). The onset to the higher decomposition temperature of PIM-1 decreased with more MEEP content in it. However, even at 55 wt % MEEP loading, membranes showed high thermal stability up to 300° C., which is higher than most polymeric membranes.

Figure 6A:
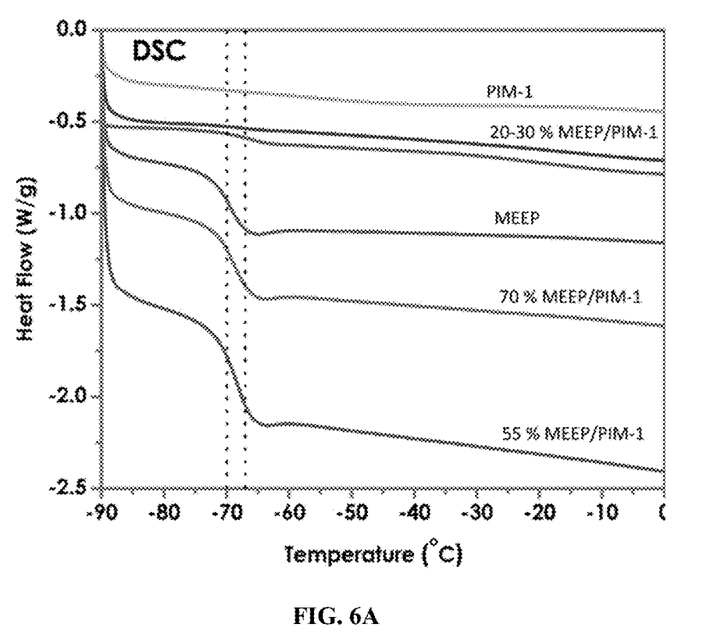
FIG. 6A depicts a DSC analysis of PIM-1, MEEP and their blends as 20, 30, 55 and 70 wt % MEEP in PIM-1.
Figure 6B:
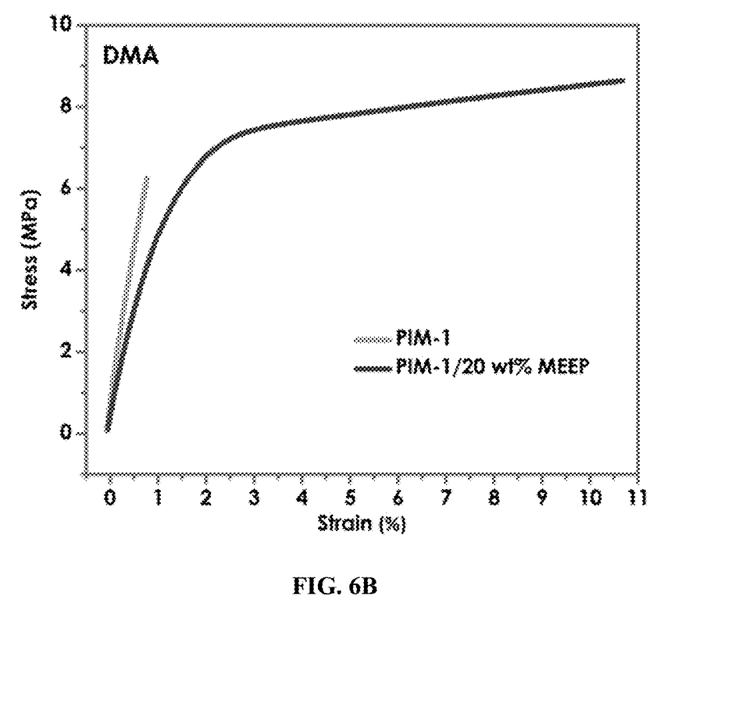
FIG. 6B depicts a tension test for mechanical properties of PIM-1 and PIM-1/20 wt % MEEP.

A nonhomogenously blended polymer may easily lead to mechanical failures such as multiple phase transitions, polymer aggregation, and porous defects. Therefore, membranes were characterized by differential scanning microscopy (DSC, FIGS. 6A-6B). PIM-1 did not show any glass transition temperature (Tg). However, the Tg of MEEP blended with PIM-1 showed that the Tg is shifting upwards as more MEEP is incorporated in PIM-1. This finding clearly indicates that the chain packing properties of MEEP is altered when blended with PIM-1. The Tg property alteration of membranes can be attributed to physical interaction between PIM-1 and MEEP as both polymers possess hydrophobic and hydrophilic functional groups. This also demonstrates that PIM-1 and MEEP blends homogeneously without any phase separation. Dynamic mechanical analysis (DMA) is another complimentary membrane characterization technique to support the assumption on homogenous blending of polymers and to confirm the improvement in mechanical properties. A tension test (stress versus strain) of samples showed that the Young's modulus of PIM-1 is about 830 MPa which is higher than Young's modulus of PIM-1/20 wt % MEEP (~550 MPa) (See FIGS. 6A-6B). While this indicates that the PIM-1 is a stiffer material than the PIM-1/MEEP blend, the very low strain to failure (<1%) also indicates that pure PIM-1 is very brittle. For practical purposes, this makes pure PIM-1 difficult to use. By contrast, the PIM-1/MEEP blend has a strain to failure of about 10.5%, which is indicative of a very tough and durable material.

Figure 7:
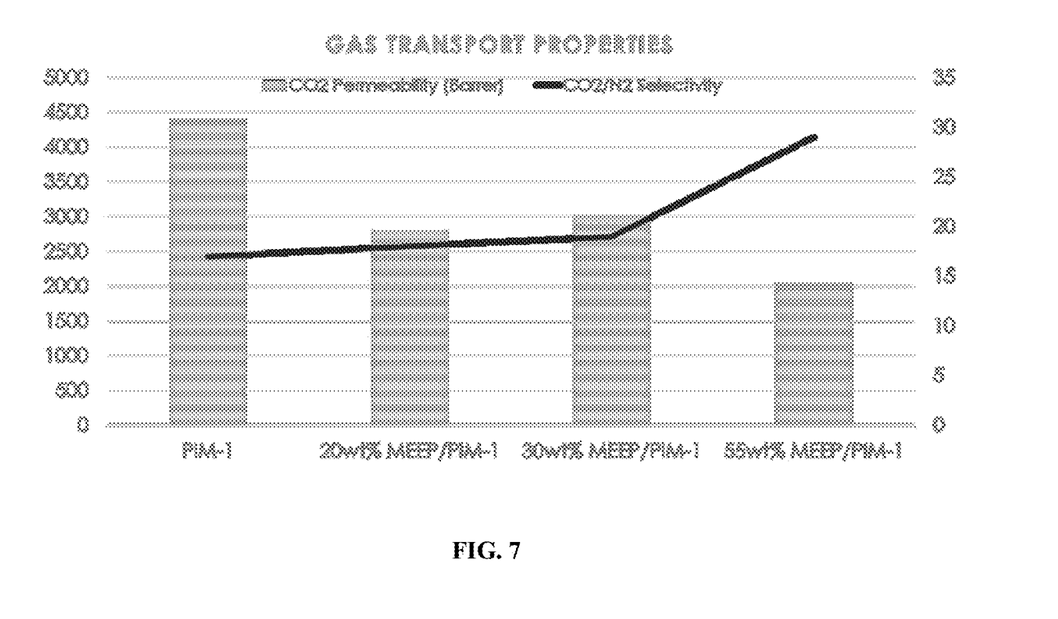
FIG. 7 depicts the $CO_2$ permeability and $CO_2/N_2$ selectivity for pure PIM-1, pure MEEP blends of 20, 30, 55 wt % MEEP in PIM-1.
Figure 8:
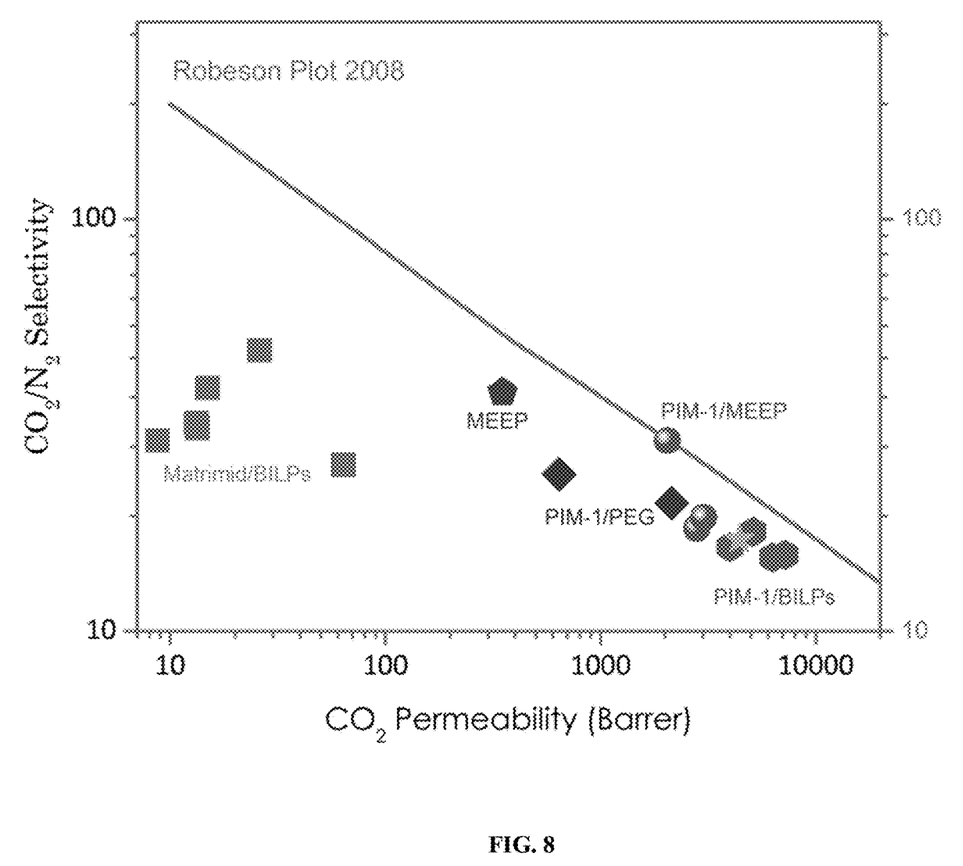
FIG. 8 depicts a graph illustrating overall $CO_2$ permeability and selectivity over $N_2$ properties of PIM-1, MEEP and their blends as 20, 30, 55 wt % MEEP in PIM-1 along with other membranes.

Gas transport properties of the membranes were investigated for $CO_2$ and $N_2$ gases using an isochoric (constant volume) gas permeability testing system. PIM-1/MEEP blends showed promising $CO_2$ permeability up to 3000 barrer and $CO_2/N_2$ selectivity as high as 29 (See FIG. 7). Although the $CO_2$ permeability of the blend decreases with higher MEEP concentrations, the $CO_2$ permeability of 2000 barrer that was observed for the 55 wt % MEEP/PIM-1 is still very high for a practical polymeric membrane. This blend lies on the Robeson upper bound which is an empirical limit for the gas separation performance of polymer membranes (See FIG. 8). In addition, MEEP blended PIM-1 membranes revealed very high $CO_2$ permeability and $CO_2/N_2$ selectivity compared to reported blended composite membranes shown in FIG. 8.

Note that in many cases, polymers that lie close to the Robeson upper bound suffer from other limitations, such as the poor mechanical properties of pure MEEP or pure PIM-1. By contrast, the incorporation of MEEP in PIM-1 demonstrated great improvement of the mechanical flexibility of PIM-1 as well as the stability of pure MEEP.

Embodiments disclose examples of blending high performance glassy polymer (PIM-1) with a rubbery polyphosphazene polymer (MEEP). This blended material overcomes severe drawbacks that exist with both of the pure polymers, particularly their mechanical properties, making them impractical for commercial use. Specifically, the blended material has a much higher failure strain than pure PIM-1 and forms a more solid film than pure MEEP.

One or more embodiments of the invented materials demonstrate very high $CO_2$ permeability compared to most polymeric membranes including MEEP; feature high $CO_2/N_2$ selectivity compared to most polymeric membranes including PIM-1. Embodiments of the invented materials exhibit high chemical and thermal stability; and are processable as the materials can dissolve in common aprotic solvents such as $CHCl_3$ and THF.

Simple commercially available monomers are used in the fabrication of the invented materials, making it practical for large commercial production and potentially low cost. Invented materials composed of polymers include both electron rich and deficient functional groups which provide a perfect interaction between the polymers to result in a homogenous polymeric film.

In one embodiment, the blend polymeric membrane may contain additives. A cross-linker additive introduces covalent bonding as a binding mechanism, attaching a polyphosphazene to a PIM via the cross-linker. Cross-linkers may act beneficially to increase mechanical strength, decrease aging, and tune the gas separation properties or hydrophobicity of the blend polymeric membrane.

Embodiments of the invented composite materials may be cast into flat sheets, as hollow fiber membranes, or as a layer in a thin film composite, as the formation of the invented membranes is less brittle compared to PIM-1 and more free-standing compared to MEEP. The invented materials are the first example of the fabrication of a flexible membrane containing PIM-1. The invented materials contain functional groups which can preferentially bind to acidic gases such as $CO_2$. The invented materials are more hydrophobic than pure MEEP.

Alternative embodiments of the invention comprises different types of polyphosphazene materials (for example, MEE polyphosphazene blended with varying levels of trifluoroethoxy (TFE) type polyphosphazene). Different types of PIM polymer, including PIM-1 or PIM-7. Polyphosphazene or MEEP that have been chemically altered with different functional groups. Polyphosphazene that is chemically bound to MEEP by cross-linking or other covalent chemical interaction. Varying molecular weights of MEEP or PIM-1. Varying percentages of MEEP blended with PIM-1. Polymers cast into different geometries, including flat sheets, hollow fibers, or a thin film composite consisting of a layer of the invented polymer coated onto a supporting substrate layer.

The blend polymeric membranes of the present disclosure are especially useful in gas separation processes; for example, in carbon capture, air purification, petrochemical, refinery, and natural gas industries. Examples of such separations include separation of gaseous mixtures where the gaseous mixtures comprise one or more gases. Exemplary separations include $CO_2$ from H2, flue gas or natural gas; H2 from $N_2$, $CH_4$, and Ar in ammonia purge gas streams; H2 recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the blend polymeric membranes described herein. More than two gases can be removed from a third gas. For example, some of the gas components which can be selectively removed from a raw natural gas using the membranes described herein include $CO_2$, oxygen, nitrogen, water vapor, $H_2S$, $NO_x$, and other trace gases. Some of the gas components that can be selectively retained include hydrocarbon gases. One or more embodiments may be used in post-combustion $CO_2$ separation or pre-combustion $CO_2$ separation. Additionally, one or more embodiments may be used in natural gas purification, land-fill gas separation, bio-gas upgrading, olefin paraffin separation, $CO_2$, $CH_4$, CO sensing, photoelectronic and/or solid state energy storage.

In such separation operations, the operation may comprise a method for the separation of a gas from a gaseous mixture while providing contacting of the gaseous mixture with the blend polymeric membrane. In contacting, the gaseous mixture would be brought into physical or chemical communication with the blend polymeric membrane, such that the gas separated permeates through the membrane at a favorable rate in comparison to at least one other constituent of the gaseous mixture. Such a method would provide, for example, the separation of $CO_2$ from flue gas by the $CO_2$ permeating through the membrane at a higher rate in comparison to $N_2$ and other trace gases of the flue gas gaseous mixture.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A blend polymeric membrane comprising:
    a blend polyphosphazene; and,
    a polymer of intrinsic microporosity, such that the blend polyphosphazene comprises 30 wt % of the blend polymeric membrane.

2. The blend polymeric membrane of claim 1, wherein the polyphosphazene comprises an ether side group.

3. The blend polymeric membrane of claim 2, wherein the polyphosphazene is poly[bis-(2-(2-methoxy)ethoxy)ethoxyphosphazene].

4. The blend polymeric membrane of claim 1, wherein the polyphosphazene comprises a first polyphosphazene and a second polyphosphazene, wherein the first polyphosphazene comprises an ether side group and the second polyphosphazene comprises a phenoxy side group.

5. The blend polymeric membrane of claim 1, wherein the polyphosphazene comprises a first polyphosphazene and a second polyphosphazene, wherein the first polyphosphazene comprises an ether side group and the second polyphosphazene comprises a trifluorethoxy side group.

6. The blend polymeric membrane of claim 1, wherein the polymer of intrinsic microporosity is PIM-1 or PIM-7.

7. The blend polymeric membrane of claim 1, wherein the polyphosphazene and the polymer of intrinsic microporosity are bound by a cross-linker.

8. The blend polymeric membrane of claim 1, wherein the blend polymeric membrane has a CO2 permeability greater than about 2500 barrer.

9. A method for the separation of a gaseous mixture, the method comprising:
    contacting the gaseous mixture with a blend polymeric membrane; and,
    wherein the blend polymeric membrane comprises a polyphosphazene and a polymer of intrinsic microporosity, such that the polyphosphazene comprises 30 wt % of the blend polymeric membrane.

10. The method of claim 9 wherein the gaseous mixture comprises one or more gases selected from the group consisting of CO2, oxygen, nitrogen, methane, hydrogen, water, CO, H2S, and NOx; and, wherein CO2 is separated from the gaseous mixture.

11. The method of claim 9, wherein the blend polymeric membrane comprises a polyphosphazene comprising an ether side group, and wherein the polymer of intrinsic microporosity is PIM-1 or PIM-7.

12. The method of claim 9, wherein the polyphosphazene and the polymer of intrinsic microporosity are bound by a cross-linker.

13. The method of claim 9, wherein the blend polymeric membrane has a CO2 permeability greater than about 2500 barrer.

* * * * *